(12) United States Patent
Jin et al.

(10) Patent No.: US 11,928,323 B2
(45) Date of Patent: Mar. 12, 2024

(54) INTERACTION METHOD, PICTURE PROCESSING METHOD, AND APPARATUS

(71) Applicant: ALIBABA GROUP HOLDING LIMITED, Grand Cayman (KY)

(72) Inventors: Xingan Jin, Hangzhou (CN); Haixin Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 329 days.

(21) Appl. No.: 17/345,894

(22) Filed: Jun. 11, 2021

(65) Prior Publication Data

US 2021/0303142 A1    Sep. 30, 2021

Related U.S. Application Data

(63) Continuation of application No. PCT/CN2019/122935, filed on Dec. 4, 2019.

(30) Foreign Application Priority Data

Dec. 11, 2018 (CN) .......................... 201811513378.6

(51) Int. Cl.
*G06K 9/00* (2022.01)
*G06F 3/04842* (2022.01)
(Continued)

(52) U.S. Cl.
CPC ...... *G06F 3/04845* (2013.01); *G06F 3/04842* (2013.01); *G06F 3/0485* (2013.01); *G06T 3/4038* (2013.01); *G06T 11/60* (2013.01)

(58) Field of Classification Search
CPC ............. G06F 3/04845; G06F 3/04842; G06F 3/0485; G06F 3/0484; G06T 3/4038; G06T 11/60; G06Q 30/0643

See application file for complete search history.

(56) References Cited

U.S. PATENT DOCUMENTS 6,677,981 B1 *   1/2004  Mancuso ............... G06T 3/4038
                                                                        348/36
7,532,771 B2 *   5/2009  Taylor .................... G06T 11/60
                                                                        382/284
(Continued)

FOREIGN PATENT DOCUMENTS

CN         104867105 A      8/2015
CN         106777329 A      5/2017
(Continued)

OTHER PUBLICATIONS

PCT International Search Report and Written Opinion dated Feb. 25, 2020, issued in corresponding International Application No. PCT/CN2019/122935 (9 pgs.).

(Continued)

*Primary Examiner* — Shervin K Nakhjavan
(74) *Attorney, Agent, or Firm* — Finnegan, Henderson, Farabow, Garrett & Dunner, LLP

(57) ABSTRACT

Embodiments of the present disclosure provide interaction methods and devices. The method can include obtaining a display object comprising a plurality of collage pictures for display; acquiring, in response to a switch operation for at least one collage picture of the plurality of collage pictures of the display object, a first target collage picture, wherein a first target content type of the first target collage picture matches a content type of the at least one collage picture; and replacing the at least one collage picture with the first target collage picture.

18 Claims, 17 Drawing Sheets

(51) Int. Cl.
*G06F 3/04845* (2022.01)
*G06F 3/0485* (2022.01)
*G06T 11/60* (2006.01)

(56) References Cited

U.S. PATENT DOCUMENTS

| | | | | |
|---|---|---|---|---|
| 8,380,005 | B1* | 2/2013 | Jonsson | G06T 11/60 382/284 |
| 9,077,823 | B1* | 7/2015 | Grosz | H04N 1/00196 |
| 9,406,156 | B2* | 8/2016 | Sugai | G06T 11/60 |
| 9,530,142 | B2* | 12/2016 | Minsky | G06Q 30/0643 |
| 10,062,133 | B1* | 8/2018 | Mishra | G06T 1/0007 |
| 10,127,632 | B1* | 11/2018 | Burke | G06F 3/4038 |
| 10,163,173 | B1* | 12/2018 | McKinley | G06F 3/0484 |
| 10,814,123 | B2* | 10/2020 | Decker | A61N 1/048 |
| 2001/0046330 | A1* | 11/2001 | Shaffer | G06F 16/58 382/284 |
| 2003/0051255 | A1* | 3/2003 | Bulman | G06Q 40/12 725/135 |
| 2004/0044589 | A1 | 3/2004 | Inoue et al. | |
| 2005/0212822 | A1* | 9/2005 | Honma | G09G 5/005 345/649 |
| 2010/0199227 | A1* | 8/2010 | Xiao | G06F 3/0481 715/863 |
| 2011/0249910 | A1* | 10/2011 | Henderson | G06V 10/993 382/278 |
| 2013/0036438 | A1* | 2/2013 | Kutaragi | H04N 21/4821 725/38 |
| 2013/0113828 | A1* | 5/2013 | Miyazaki | G06Q 30/0643 345/633 |
| 2013/0335450 | A1* | 12/2013 | Han | G06T 11/60 345/634 |
| 2014/0168217 | A1* | 6/2014 | Kim | G06T 19/20 345/420 |
| 2014/0176565 | A1* | 6/2014 | Adeyoola | G06T 19/006 345/473 |
| 2014/0211065 | A1* | 7/2014 | Sudheendra | H04N 1/2112 348/333.02 |
| 2014/0226900 | A1* | 8/2014 | Saban | H04N 23/63 382/165 |
| 2014/0357362 | A1* | 12/2014 | Cohen | A63F 13/655 463/31 |
| 2015/0067600 | A1* | 3/2015 | Steinberg | G06F 18/232 715/822 |
| 2016/0055504 | A1* | 2/2016 | Murray | G06Q 13/80 705/7.33 |
| 2016/0139761 | A1* | 5/2016 | Grosz | H04N 1/00145 715/769 |
| 2016/0180449 | A1* | 6/2016 | Naware | G06T 13/40 703/7 |
| 2016/0292820 | A1* | 10/2016 | Kuan | G06F 3/1446 |
| 2017/0287060 | A1* | 10/2017 | Choi | G06T 15/04 |
| 2018/0047192 | A1* | 2/2018 | Kristal | G06Q 30/0643 |
| 2019/0050427 | A1* | 2/2019 | Wiesel | G06T 19/00 |
| 2019/0171914 | A1* | 6/2019 | Zlotnick | G06F 18/41 |
| 2020/0066029 | A1* | 2/2020 | Chen | G06T 15/04 |
| 2020/0258431 | A1* | 8/2020 | Cai | G09F 9/3026 |

FOREIGN PATENT DOCUMENTS

| | | |
|---|---|---|
| CN | 107224721 A | 10/2017 |
| CN | 108491140 A | 9/2018 |
| CN | 108886586 A | 11/2018 |
| CN | 108924626 A | 11/2018 |
| WO | WO 2020/119543 A1 | 6/2020 |

OTHER PUBLICATIONS

The Chinese first Office Action issued for Chinese Application No. 201811513378.6, dated Mar. 31, 2023, (7 pages), along with the Chinese Search Report for Chinese Application No. 2018115133786, dated Mar. 29, 2023, (2 pages).

European Patent Office Communication issued for Application No. 19895203.8 which encloses the extended European Search Report which includes pursuant to Rule 62 EPC, the Supplementary European Search Report (Art. 153(7) EPC) and the European search opinion, dated Sep. 27, 2022, 8 pages.

* cited by examiner

US 11,928,323 B2

INTERACTION METHOD, PICTURE PROCESSING METHOD, AND APPARATUS

CROSS-REFERENCE TO RELATED APPLICATION

The present disclosure claims the benefits of priority to International Application No. PCT/CN2019/122935, filed on Dec. 4, 2019, which claims priority to Chinese Patent Application No. 201811513378.6 filed on Dec. 11, 2018, both of which are incorporated herein by reference in their entireties.

BACKGROUND

Conventional display interfaces have simple visual effects. Users can only view pictures available on the display interface. When the users prefer certain desired contents with pictures, the users can obtain a large number of other pictures through searching. However, a large number of searches can cause excessive computing resource consumption.

SUMMARY

Embodiments of the present disclosure provide interaction methods and apparatuses. The method can include obtaining a display object comprising a plurality of collage pictures for display; acquiring, in response to a switch operation for at least one collage picture of the plurality of collage pictures of the display object, a first target collage picture, wherein a first target content type of the first target collage picture matches a content type of the at least one collage picture; and replacing the at least one collage picture with the first target collage picture.

Embodiments of the present disclosure provide picture processing methods and apparatuses. The method can include determining at least one content type corresponding to an original picture; cropping the original picture to obtain picture areas respectively corresponding to the at least one content type; and taking the picture areas respectively corresponding to the at least one content type as a plurality of collage pictures, wherein the plurality of collage pictures of the at least one content type are combined to form a display object.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings.

DETAILED DESCRIPTION

Figure 1:
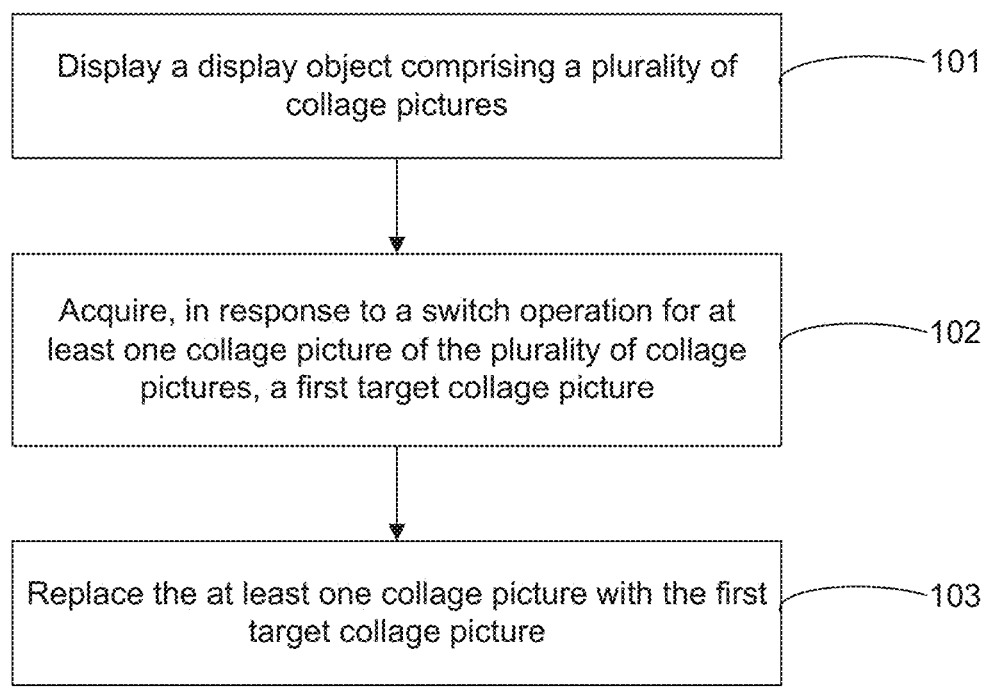
FIG. 1 shows a flow chart of an exemplary interaction method, consistent with some embodiments of the present disclosure.

To facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

As described, in some conventional systems, a user can only view currently displayed pictures on a display interface. For example, in a commodity matching recommendation scenario in e-commerce, only pictures of models who have already dressed up can be shown to a user, but the user may only like the tops but not the bottoms shown in the pictures of the models. If the user wants to find his/her favorite matching effect, he/she can search and view a large number of pictures. If the user does not like the pictures and wishes to view different pictures, the use can search for preferred pictures. Frequent picture searching by users can cause heavy workload on computing systems, such as on processor resources and network communication resources. For instance, a collage picture could be a high resolution image resulting in a large file. Switching out an entire collage file could tax the processing of the device, along with the network resources (such as bandwidth). Switching out only a portion of the file could save network resources. In addition, the amount of images retrieved from data storage and transferred to terminals for display can cause burden in picture searching. For example, when the user searches for a category of pictures (e.g., shoes), 30 or more pictures of this category are expected to be retrieved from data storage and transferred to user terminals for display instantly for optimal user experience. In comparison, when a candidate pool of three pictures is displayed for the user, the user can select one from the candidate pool to swap a current picture. One high-resolution image of the selected picture is expected to be retrieved and the total number of pictures retrieved at once for display can be limited to the number of pictures in the candidate pool. One more picture can be retrieved every time upon the user swap operation. In a peak user activity hour (e.g., a closing hour of an annual sales event), taking millions of users into consideration, a reduced amount of images or portion of files retrieved from the data storage and transferred to the user terminals for all users combined can make a significant difference to computing workloads of the servers and bandwidth consumption of the networks during the peak hour. Server crashes due to overload can be prevented in such situations without requiring server scaling.

The embodiments of the present disclosure provide diversified display contents by combining and switching collage pictures, which enriches the visual effect. In a commodity matching scenario, collage pictures can be pictures that can be displayed in combinations, such as pictures of tops and bottoms. Exemplary systems can realize a user's need for free matching and enrich the visual effect, and enable the display of diversified display contents without a large number of searches. Moreover, a new interaction method is provided, which enriches the user interaction manner and improves user experience.

FIG. 1 shows a flow chart of an exemplary interaction method, consistent with some embodiments of the present disclosure. The method can be performed by a client terminal. The method can include the following steps.

In step 101, a display object composed of a plurality of collage pictures is displayed. Here, the plurality of collage pictures can be obtained by cropping one or more original pictures. The display content presented by the display object is formed by splicing the picture content in the plurality of collage pictures.

In order to ensure the visual effect of the display content presented by the display object, a plurality of collage pictures can be spliced in a predetermined splicing manner, so that the display content presented by the display object meets certain aesthetic requirements and forms content with a specific shape or a specific structure. For the collage picture, its corresponding content type can be determined according to its picture content.

A plurality of content types can be needed to form a display object, and the plurality of collage pictures can be determined according to the plurality of content types corresponding to the display object.

In some embodiments, the collage picture can be obtained by cropping, according to its content type, picture areas corresponding to the content type in an original picture to which it belongs. That is, each collage picture can be obtained by cropping, according to its content type, picture areas corresponding to the content type in an original picture to which it belongs.

In addition, the collage picture can also be specifically obtained by recognizing a target object in an original image to which it belongs and various constituent parts of the target object, and cropping the original image according to the various constituent parts; and the content type of the collage picture is determined according to its corresponding constituent part, and the specific content type of the collage picture can refer to its corresponding constituent part.

The various constituent parts of the target object can be preset according to actual needs. For example, when the main object is a human body, the various constituent parts can include a head part, other body parts except the head, an upper body part, a lower body part, a one-piece body part, and a foot part. Here, the upper body part refers to the body part wearing tops (such as T-shirts, shirts, and vests), the lower body part refers to the body part wearing bottoms (such as shorts, pants, and skirts), and the one-piece body part refers to the body part wearing one-pieces (such as dresses and jumpsuits). The foot part can also refer to the body part wearing shoes (such as boots).

Therefore, the plurality of collage pictures can be determined according to the various constituent parts of the target object. The plurality of collage pictures can be combined to form a display object including the target object, wherein different collage pictures corresponding to the same constituent part have different picture contents.

The target object can refer to a human body, for example. The display content (skin color, clothing, portrait, figure, etc.) of the human body in different original pictures can be different, and the plurality of collage pictures can respectively correspond to human bodies with different display contents or at least some of the collage pictures respectively correspond to human bodies with different display contents.

In some embodiments, the method can further include: providing an interactive interface. The step 101 of displaying the display object composed of the plurality of collage pictures includes: displaying the display object composed of the plurality of collage pictures in the interactive interface.

In some embodiments, the interactive interface can be provided when a user interaction trigger request is received.

In step 102, in response to a switch operation for any one of the collage pictures, a first target collage picture having content type that matches the any one of the collage pictures is acquired. In some embodiments, the first target collage picture having content type that matches the any one of the collage pictures can be found from a collage picture set. The collage picture set can be sent from a server terminal to a client terminal.

In some embodiments, the first target collage picture having content type that matches the any one of the collage pictures can also be requested from the server terminal.

Each collage picture in the collage picture set can be obtained by cropping, according to its content type, picture areas corresponding to the content type in an original picture to which it belongs. The plurality of collage pictures in the display object can be switched.

In addition, one or more collage pictures can be switched at the same time, so when a switch operation for any one of the collage pictures is detected, the operation of step 102 can be performed.

Here, the first target collage picture having content type that matches the any one of the collage pictures can be a first target collage picture having content type that is the same as that of the any one of the collage pictures; and In some embodiments, the first target collage picture having content type that at least contains the content type of the any one of the collage pictures.

For example, if the content type of the first target collage picture is a one-piece body part, and the content type of the any one of the collage pictures is an upper body part, then the one-piece body part contains the upper body part.

In some embodiments, the step of acquiring, in response to the switch operation for any one of the collage pictures, the first target collage picture having content type that matches the any one of the collage pictures can include: acquiring, in response to a specified slide operation for any one of the collage pictures, a first target collage picture having content type that matches the any one of the collage pictures.

The specified slide operation can refer to, for example, a slide operation in a predetermined direction, or the dragging of the any one of the collage pictures, that is, a slide operation for controlling the any one of the collage pictures to move from a first position to a second position, and the like.

In some embodiments, the switch operation for any one of the collage pictures can also refer to a click operation for the any one of the collage pictures, such as a single click or a double click.

In step 103, at least the any one of the collage pictures with the first target collage picture is replaced.

After the first target collage picture is obtained, the any one of the collage pictures can be replaced with the first target collage picture to update the display content of the display object.

After replacing at least the any one of the collage pictures with the first target collage picture, the process can return to step 101 and continue, that is, the first target collage picture is taken as a new collage picture and it is possible to continue to request switching the collage pictures in the display object to continue to update the display content of the display object.

Through combination and switching of a plurality of collage pictures, different display contents can be displayed, which enriches the visual effect, enables to obtain diversified display contents without a large number of picture searches, and reduces resource consumption. In addition, the user interaction is improved.

The combination manner of a plurality of collage pictures can be splicing or collaging, that is, any two collage pictures can partially overlap.

In some embodiments, the step of displaying a display object composed of a plurality of collage pictures can include: splicing the plurality of collage pictures according to a splicing sequence of the plurality of collage pictures to obtain the display object; and displaying the display object. That is, a picture splicing technology can be used to sequentially splice the plurality of collage pictures according to a splicing sequence to form the display object. Here, the splicing sequence of the plurality of collage pictures can be determined according to content types of the plurality of collage pictures.

Therefore, in some embodiments, before the splicing the plurality of collage pictures according to a splicing sequence of the plurality of collage pictures to obtain the display object, the method can further include: according to a plurality of content types corresponding to the display object, acquiring collage pictures respectively corresponding to the plurality of content types to obtain the plurality of collage pictures; and taking a splicing sequence corresponding to the plurality of content types as the splicing sequence of the plurality of collage pictures.

Here, the splicing sequence corresponding to the plurality of content types can be preset. In addition, when the plurality of content types respectively correspond to various constituent parts of the target object, the splicing sequence corresponding to the plurality of content types can be the connection sequence of the various constituent parts of the target object. For example, when the various constituent parts consist of a head part, an upper body part, a lower body part, and a foot part, the connection sequence can be that the head part connects to the upper body part, the upper body part connects to the lower body part, and the lower body part connects to the foot part.

In some embodiments, the plurality of collage pictures can include at least one bottom layer collage picture and at least one upper layer collage picture; and the step of displaying the display object composed of the plurality of collage pictures can include: splicing the at least one bottom layer collage picture according to a splicing sequence of the at least one bottom layer collage picture to obtain a bottom layer picture; determining a collage starting position of the at least one upper layer collage picture in the bottom layer picture; determining a hierarchical sequence of the at least one upper layer collage picture; sequentially combining the at least one upper layer collage picture on the bottom layer picture according to the collage starting position and the hierarchical sequence of the at least one upper layer collage picture to obtain the display object; and displaying the display object.

That is, the display object can be displayed by a plurality of collage pictures in a layered and superimposed manner, and there are collage pictures that overlap at least partially. The display object is mainly divided into a bottom layer and an upper layer. The bottom layer can use the image splicing technology to splice at least one bottom layer collage picture to obtain a bottom layer picture. The upper layer can sequentially cover the bottom layer picture in a hierarchical sequence according to the collage starting position of at least one upper layer collage picture in the bottom layer picture.

In some embodiments, each bottom layer collage picture can be obtained by cropping a bottom layer original picture to which it belongs, and each upper layer collage picture can be obtained by cropping an upper layer original picture to which it belongs, so the bottom layer picture can be specifically obtained by splicing a plurality of bottom layer collage pictures.

In some embodiments, the bottom layer collage picture can refer to the bottom layer original picture, that is, the bottom layer original picture is taken as the bottom layer collage picture, in which case a bottom layer collage picture can be taken as the bottom layer picture.

In some embodiments, the collage starting position of at least one upper layer collage picture in the bottom layer picture can be determined according to the content type of the at least one upper layer collage picture.

The hierarchical sequence of the at least one upper layer collage picture can also be determined according to the content type of the at least one upper layer collage picture.

In some embodiments, after splicing the at least one bottom layer collage picture according to the splicing sequence of the at least one bottom layer collage picture to obtain a bottom layer picture, the method can further include: acquiring at least one bottom layer picture content type bottom layer collage picture and at least one upper layer collage picture according to at least one content type of a corresponding bottom layer picture and at least one content type corresponding to an upper layer picture of the display object.

The splicing sequence of the at least one bottom layer collage picture can refer to the splicing sequence corresponding to the content types of the at least one bottom layer collage picture.

The splicing sequence corresponding to the content types of the at least one bottom layer collage picture can be preset. In addition, a bottom layer original picture can be cut according to various first constituent parts corresponding to a target object. Therefore, the at least one bottom layer collage picture respectively corresponds to the various first constituent parts of the target object. The splicing sequence corresponding to the content types of the at least one bottom layer collage picture can be the connection sequence of the various first constituent parts of the target object. For example, if each first constituent part is composed of a head part and other body parts except the head, it can be known that the head part is connected to other body parts.

The collage starting position of the at least one upper layer collage picture can be determined according to the content type of the at least one upper layer collage picture.

In some embodiments, when both the bottom layer collage picture and the upper layer collage picture correspond to constituent parts of a target object, the upper layer original picture can be cut according to various second constituent parts corresponding to the target object. Therefore, the collage starting position of the at least one upper layer collage picture can be determined according to the second constituent parts corresponding to the at least one upper layer collage picture. The display content of the bottom layer picture formed by splicing at least one bottom layer collage picture includes the target object. According to the various second constituent parts of the target object, the splicing positions of the various second constituent parts in the bottom layer picture can be determined. Therefore, the collage starting position of the upper layer collage picture can be determined according to the splicing position of its corresponding second constituent part.

Here, both the first constituent parts and the second constituent parts are determined according to the composition structure of the target object, and they can be the same or different. The "first" and "second" are only used to distinguish different cropping of the bottom layer original picture and the upper layer original picture.

For example, if the at least one upper layer collage picture respectively corresponds to an upper body part and a lower body part of a human body, the collage starting position of the upper body part in the bottom layer picture is the splicing position of a head part and the upper body part of the target object in the bottom layer picture, and the collage starting position of the lower body part is the splicing position of the upper body part and the lower body part of the target object in the bottom layer picture.

Figure 2A:
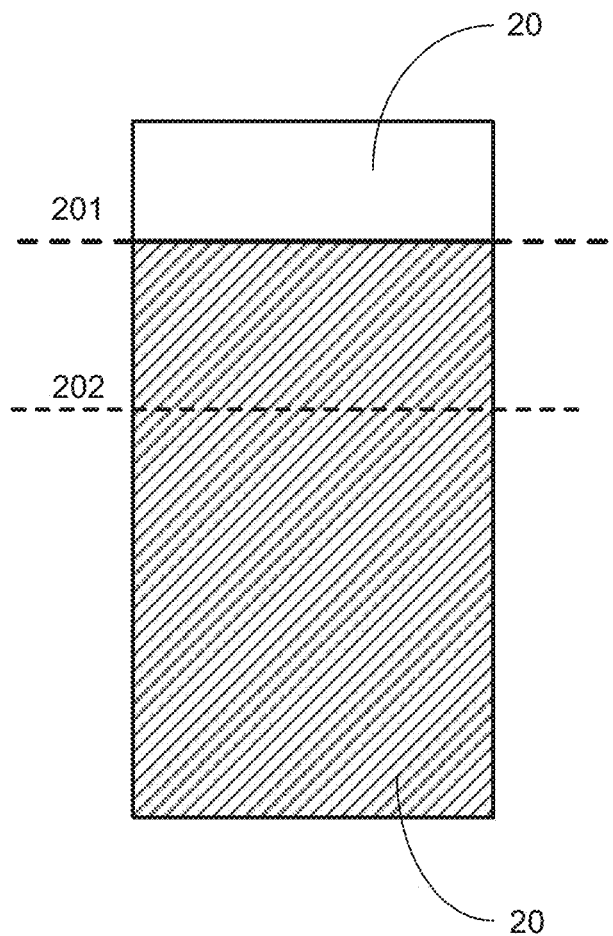
FIG. 2a to FIG. 2g respectively show schematic diagrams of exemplary picture interaction, consistent with some embodiments of the present disclosure.
Figure 2B:
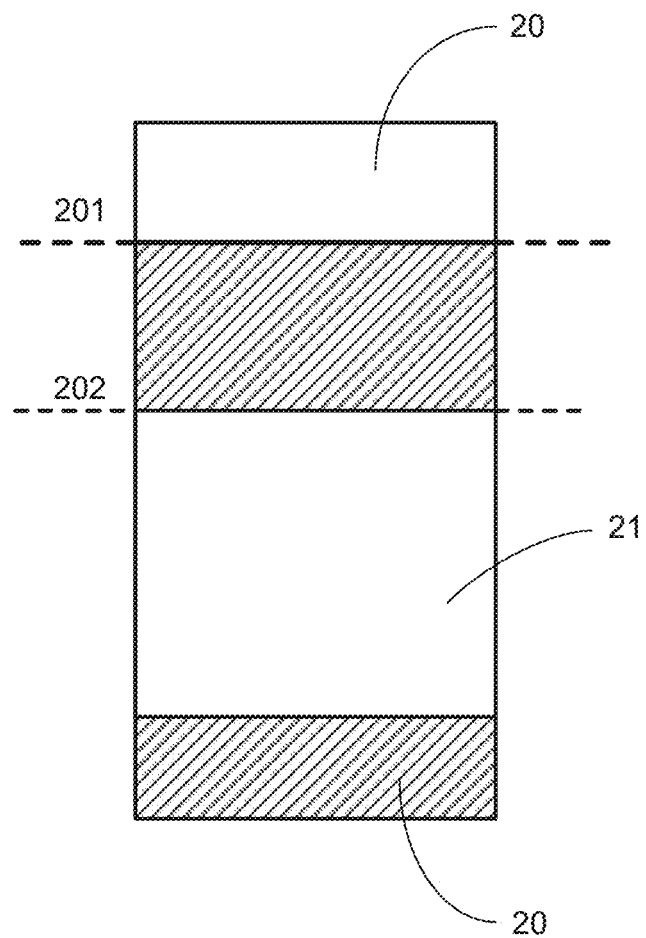
Figure 2C:
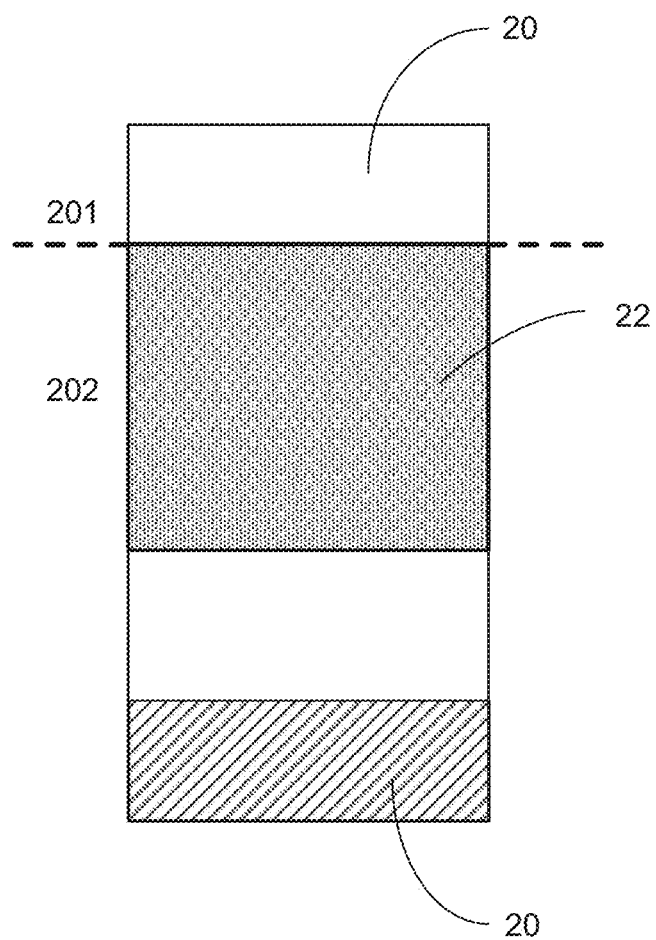

As shown in FIGS. 2a-2c, FIG. 2a is an exemplary bottom layer picture formed by splicing at least one bottom layer collage picture. The bottom layer picture includes two bottom layer collage pictures 20, respectively corresponding to constituent part A and constituent part B of a target object. In some embodiments, the target object can be divided into constituent part A, constituent part B, constituent part C, and constituent part D, the splicing position of the target object can include position 201 of the splicing line between constituent part A and constituent part B, position 201 of the splicing line between constituent part A and constituent part C, and position 202 of the splicing line between constituent part C and constituent part D. It can be seen that the position of the splicing line between constituent part A and constituent part B is the same as that of the splicing line between constituent part A and constituent part C.

In some embodiments, one upper layer collage picture includes two upper layer collage pictures, which respectively correspond to constituent part C and constituent part D. Further, in some embodiments, the hierarchical sequence of various constituent parts is that constituent part A and constituent part B are located at the bottom layer, constituent part D is located at the second layer on the bottom layer, and constituent part C is located at the third layer on the second layer. It can be seen that the splice starting position of the upper layer collage picture corresponding to constituent part C is position 201 of the splicing line, and the splice starting position of the upper layer collage picture corresponding to constituent part D is position 202 of the splicing line.

As shown in FIG. 2b, after the bottom layer collage pictures respectively corresponding to constituent part A and constituent part B are spliced to form the bottom layer picture, upper layer collage picture 21 corresponding to constituent part D of the second layer is superimposed from position 202 of the splicing line.

As shown in FIG. 2c, upper layer collage picture 22 corresponding to constituent part C of the second layer is superimposed from the position of splicing line 201 to obtain the display object in FIG. 2c.

As shown in FIGS. 2b and 2c, upper layer collage picture 22 corresponding to constituent part C covers at least part of the content of upper layer collage picture 21 corresponding to constituent part D.

Figure 2D:
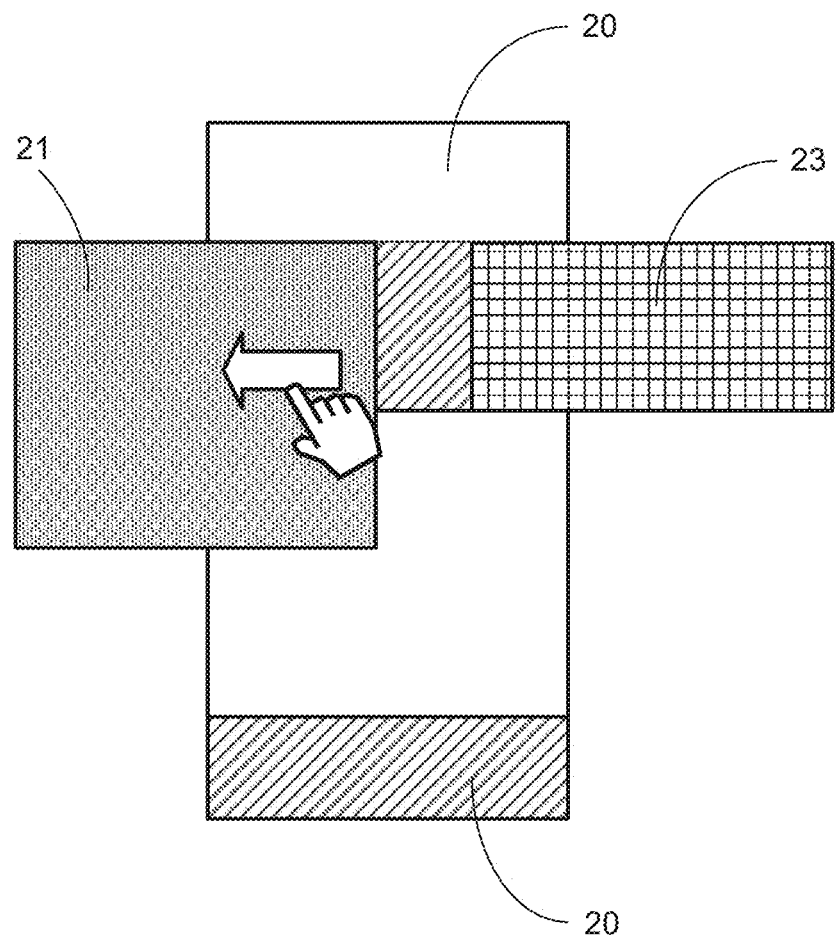
Figure 2E:
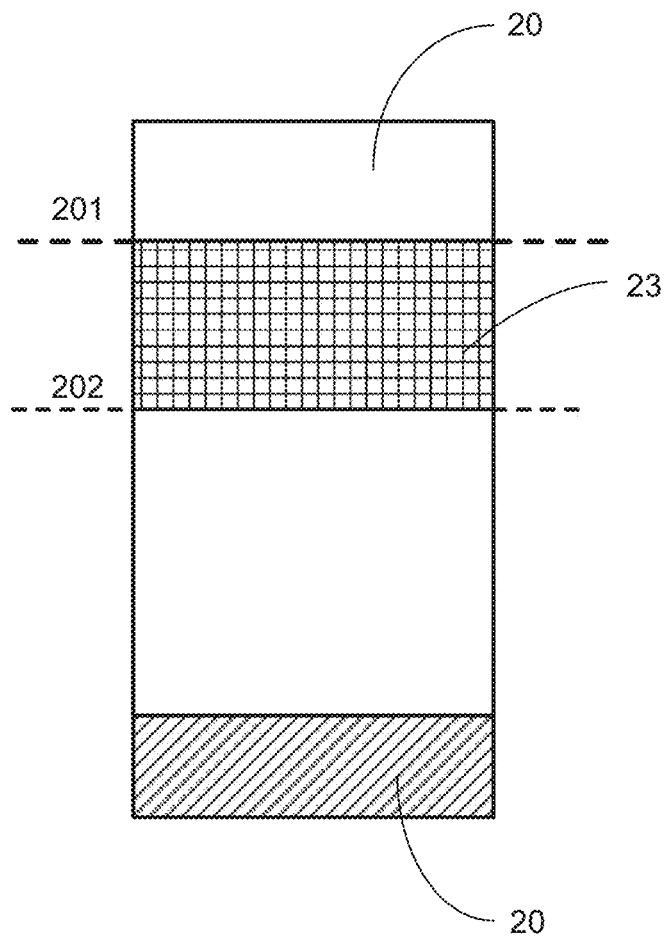

For the display object, a user can perform a switch operation for any one of the collage pictures. For example, if a switch operation for upper layer collage picture 21 corresponding to constituent part D is detected as shown in FIG. 2d, the user can search for upper layer collage picture 23 corresponding to constituent part D as the first target collage picture according to the content type (i.e., constituent part D) of upper layer collage picture 21, and then can replace upper layer collage picture 21 with upper layer collage picture 23 as shown in FIG. 2d, to obtain the display object with display content updated as shown in FIG. 2e.

In some embodiments, the method can further include: displaying at least one collage prompt message; determining, in response to a selection operation for any one of the collage prompt messages, a picture to be collaged corresponding to the any one of the collage prompt messages; and collaging the picture to be collaged in the display object according to a collage starting position of the picture to be collaged in the bottom layer picture.

Here, each collage prompt message can correspond to a collage picture, and for any one of the collage prompt messages selected, a corresponding collage picture can be determined, which is named "a picture to be collaged" for convenience of distinction.

According to the content type of the picture to be collaged, the collage starting position thereof in the bottom layer picture can be determined, and the picture to be collaged can be collaged in the display object, that is, covers the display object from its corresponding splice starting position. The picture to be collaged is taken as the uppermost layer collage picture and covers other layers of collage pictures.

Figure 2F:
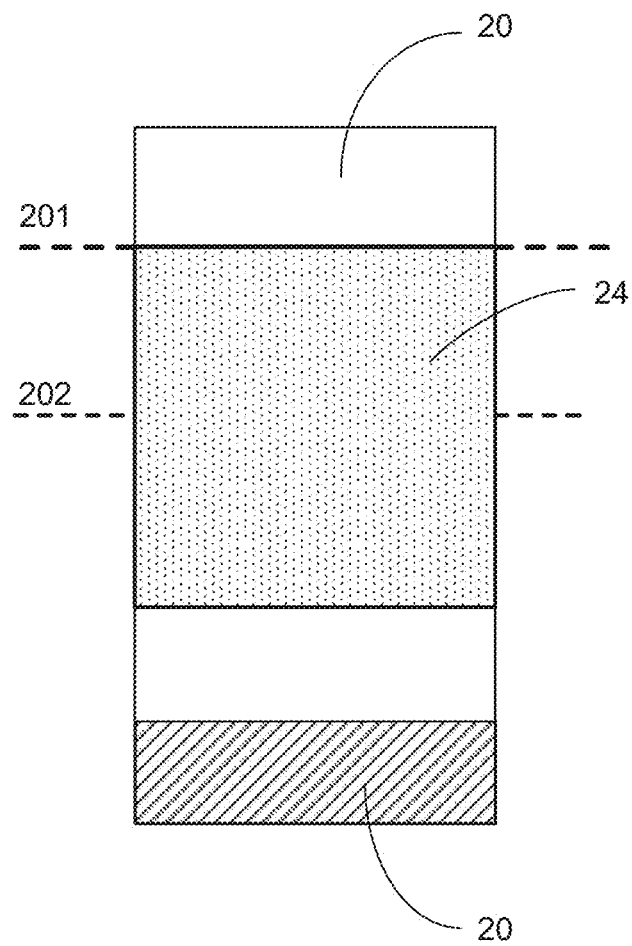

As shown in FIG. 2f, based on the display object of FIG. 2c, the splice starting position of the picture to be collaged is splicing line 201, FIG. 2e shows the display object with updated display content which is obtained after picture to be collaged 24 is collaged.

Here, the collage prompt message can be a thumbnail of its corresponding collage picture, so as to facilitate a user to understand the picture content of its corresponding collage picture.

In some embodiments, after the replacing the any one of the collage pictures with the first target collage picture, the method can further include: searching whether there is a second target collage picture whose picture content matches the first target collage picture and having content type that is different from the first target collage picture; and replacing an unreplaced collage picture corresponding to the content type of the second target collage picture in the display object with the second target collage picture.

Here, the corresponding relationship of collage pictures whose picture contents match but having content type that are different can be preset. Therefore, the second target collage picture can be obtained by searching the corresponding relationship.

In addition, since the plurality of collage pictures can be from different original pictures, in order to ensure the effect of combination, in some embodiments, before the sequentially combining the at least one upper layer collage picture on the bottom layer picture according to the collage starting position and the hierarchical sequence of the at least one upper layer collage picture to obtain the display object, the method further includes the following steps. It is determined whether the main content in any one of the upper layer collage pictures meets collage requirements. If the main content in any one of the upper layer collage pictures does not meet the collage requirements, the any one of the upper layer collage pictures according to the collage requirements is adjusted to meet the collage requirements.

The collage requirements can refer to, for example, whether the proportion of the main content of any one of the upper layer collage pictures is the same as the proportion of the main content corresponding to the content type of the any one of the upper layer collage pictures in a bottom layer picture. If the proportion of the main content of any one of the upper layer collage pictures is not the same as the proportion of the main content corresponding to the content type of the any one of the upper layer collage pictures in the bottom layer picture, the any one of the upper layer collage pictures can be enlarged or reduced, so that the proportions of the main content of the two pictures are the same, so that seamless splicing can be realized.

For another example, the collage requirements can refer to whether the display direction of the main content of any one of the upper layer collage pictures is the same as that of the main content corresponding to the content type of the any one of the upper layer collage pictures in the bottom layer picture. If the display direction of the main content of any one of the upper layer collage pictures is not the same as that of the main content corresponding to the content type of the any one of the upper layer collage pictures in the bottom layer picture, the any one of the upper layer collage pictures can be rotated to adjust the display direction of the main content, so that the display direction is the same as the display direction of the picture content corresponding to the content type of the any one of the upper layer collage pictures in the bottom layer picture.

Here, the main content of any one of the upper layer collage pictures can refer to the picture content including its corresponding constituent parts.

In some embodiments, the content type of the first target collage picture at least contains the content type of the any one of the collage pictures. Therefore, the step of acquiring, in response to the switch operation for any one of the collage pictures, the first target collage picture having content type that matches the any one of the collage pictures can include: acquiring, in response to the switch operation for any one of the collage pictures, a first target collage picture having content type that contains at least the content type of the any one of the collage pictures. The step of replacing at least the any one of the collage pictures with the first target collage picture includes: determining at least one picture to be replaced in the plurality of collage pictures according to the content type of the first target collage picture; and replacing the at least one picture to be replaced with the first target collage picture.

Here, the at least one picture to be replaced includes the any one of the collage pictures.

For example, if the content type of the first target collage picture is the one-piece body part, and the content type of the any one of the collage pictures is the upper body part, then the one-piece body part contains the upper body part. In addition, the one-piece body part can also include the lower body part; therefore, the at least one picture to be replaced includes a collage picture of the upper body part and a collage picture of the lower body part.

Figure 2G:
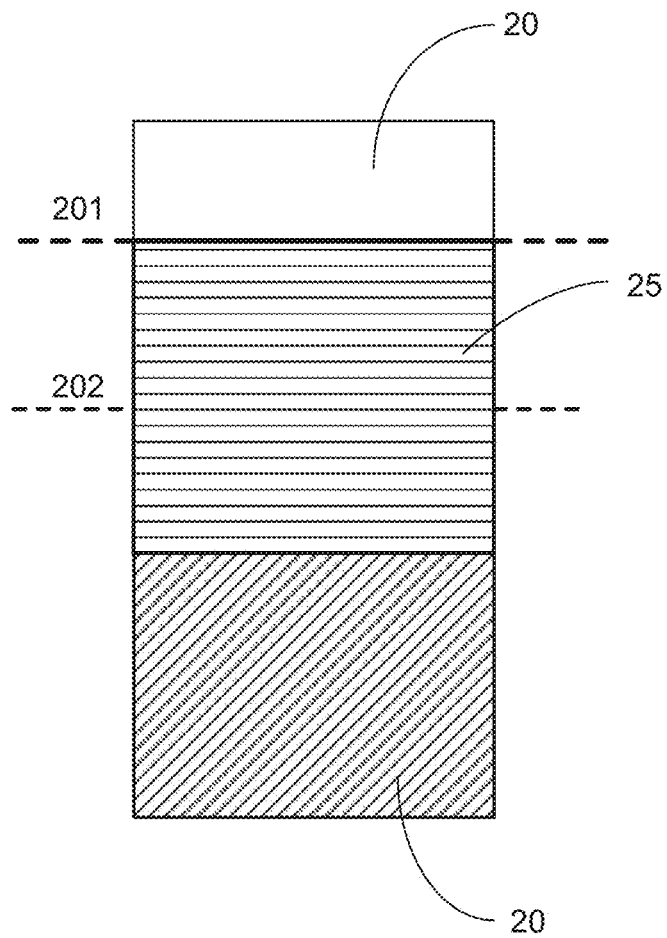

As shown in FIG. 2g, based on the display object shown in FIG. 2c, if a switch operation for upper layer collage picture 21 of constituent part C is detected, the target object is also divided to have constituent part E, and the content type of the first target collage picture that matches upper layer collage picture 21 is constituent part E, constituent part E contains constituent part C and constituent part D. Therefore, the at least one picture to be replaced not only includes upper layer collage picture 21 but also includes upper layer collage picture 22. FIG. 2g shows a schematic diagram of an exemplary display object after the at least one picture being replaced with first target collage picture 25.

Here, in some embodiments, the step of acquiring, in response to the switch operation for any one of the collage pictures, the first target collage picture having content type that matches the any one of the collage pictures can include: randomly selecting a collage picture from various collage pictures corresponding to the content type of the any one of the collage pictures, or selecting a next adjacent collage picture of the any one of the collage pictures according to a display sequence of the various collage pictures as the first target collage picture.

Figure 3:
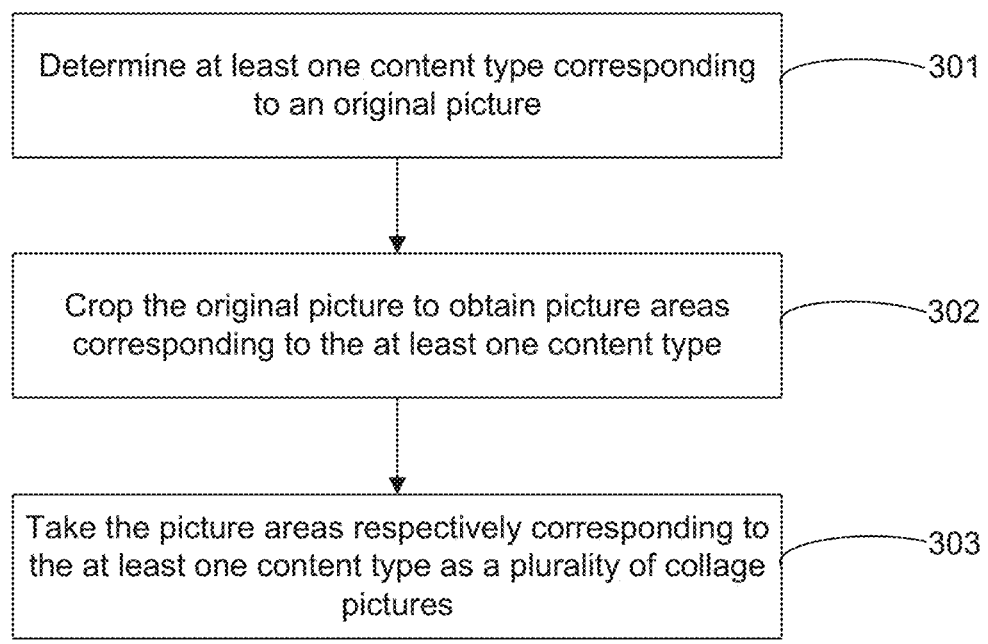
FIG. 3 shows a flow chart of an exemplary picture processing method, consistent with some embodiments of the present disclosure.

FIG. 3 shows a flow chart of an exemplary picture processing method, consistent with some embodiments of the present disclosure. Exemplary acquisition of collage pictures is described. The method can include the following steps.

In step 301, determining at least one content type corresponding to an original picture is performed.

In step 302, cropping the original picture to obtain picture areas respectively corresponding to the at least one content type is performed.

In step 303, taking the picture areas respectively corresponding to the at least one content type as collage pictures is performed.

Here, collage pictures of different content types are combined to form a display object.

A server terminal can save the corresponding relationship between each collage picture and its content type to form a collage picture set, and can provide the collage picture set to a client terminal, so that the client terminal can select a first target collage picture from the collage picture set to replace any one of the collage pictures requested to be switched in the display object.

In some embodiments, the step of cropping the original picture to obtain picture areas respectively corresponding to the at least one content type includes: recognizing various constituent parts of a target object in the original picture; determining content types respectively corresponding to the various constituent parts; and cutting the original picture according to the various constituent parts to obtain the picture areas respectively corresponding to the at least one content type.

The step of taking the picture areas respectively corresponding to the at least one content type as collage pictures includes: taking the picture areas where the constituent parts respectively corresponding to the at least one content type are located as collage pictures.

Here, the original picture can be cut through a cutting method such as horizontal cutting, vertical cutting, or circular cutting, to form collage pictures with a specific shape.

In some embodiments, the original picture can include a bottom layer original picture and an upper layer original picture.

The recognizing various constituent parts of a target object in the original picture can include: for the bottom layer original picture, recognizing various first constituent parts of the target object in the bottom layer original picture; and for the upper layer original picture, recognizing various second constituent parts of the target object in the upper layer original picture.

The step of determining content types respectively corresponding to the various constituent parts can include: determining content types respectively corresponding to the various first constituent parts for the bottom layer original picture; and determining content types respectively corresponding to the various second constituent parts for the upper layer original picture.

The step of cutting the original picture according to the various constituent parts can include: for the bottom layer original picture, cutting the bottom layer original picture according to the various first constituent parts to obtain the picture areas respectively corresponding to the at least one content type; and for the upper layer original picture, cutting the upper layer original picture according to the various second constituent parts to obtain the picture areas respectively corresponding to the at least one content type.

The step of taking picture areas where the constituent parts respectively corresponding to the at least one content type are located as collage pictures includes: for the bottom layer original picture, taking the picture areas where the first constituent parts respectively corresponding to the at least one content type are located as bottom layer collage pictures; and for the upper layer original picture, taking the picture areas where the second constituent parts respectively corresponding to the at least one content type are located as upper layer collage pictures.

At least one bottom layer collage picture is used to be spliced to obtain a bottom layer picture; and at least one upper layer collage picture is used to be collaged on the bottom layer picture to obtain a display object.

In some embodiments, the upper layer original picture can refer to an original product picture, and the original product picture includes a human body wearing a product. Specifically, an obtained product picture that matches user behavior characteristics is captured from an e-commerce platform. The user behavior characteristics can refer to, for example, historical purchase records, and a purchased product can be determined according to the historical purchase records, and a product picture of the purchased product can be used as an original product picture.

Therefore, in some embodiments, the method can further include: determining an original product picture that matches user behavior characteristics.

The bottom layer original picture can refer to an original standard picture, which is obtained by collecting images of human bodies of models.

In some embodiments, the determining at least one content type corresponding to an original picture includes: determining, for the original product picture and according to a product category corresponding to the original product picture, a content type corresponding to the product category; and determining, for the original standard picture, at least one content type pre-configured for the original standard picture.

In some embodiments, the methods can be applied to a product matching recommendation scenario in an e-commerce platform.

The bottom layer collage picture can be obtained by cropping an original standard picture; the original standard picture is obtained by collecting images of human bodies of models; the upper layer collage picture is obtained by cropping an original product picture; and the original product picture includes a human body wearing a product.

The content type of the collage picture is determined according to its corresponding constituent part of a human body. That is, each collage picture (including the bottom layer collage picture or the upper layer collage picture) corresponds to a constituent part of a human body, and its corresponding content type is determined according to its corresponding constituent part. For example, when the product is clothing, it is suitable for clothing matching recommendation scenarios.

The original standard picture and the original product picture can be cut according to various constituent parts of a human body. Optionally, the original standard picture and the original product picture can choose to contain pictures of a human body in a standing posture.

In the clothing matching recommendation scenario, since clothing includes many categories such as tops, coats, pants, skirts, shoes, and bags, it can be classified into tops, bottoms, one-pieces, coats, shoes, etc. Therefore, the human body can be divided into a head part, an upper body part, a lower body part, an one-piece body part, a foot part, and the like.

Here, a picture of the human body that satisfies the posture requirement can be selected from a picture set provided by a product provider as an original product picture. In order to adapt to various human body postures in the original product picture, an original standard picture can be obtained by collecting images of human bodies of models in different postures (such as different standing postures).

Standard collage pictures can be specifically obtained by cropping the original standard picture, and product collage pictures can be specifically obtained by cropping the original product picture.

The original standard picture can be cropped to obtain standard collage pictures corresponding to the head part and standard collage pictures corresponding to body parts other than the head. In addition, the splicing positions between different constituent parts can be determined for various constituent parts of the human body, so that for the bottom layer picture obtained by splicing the standard collage pictures, the corresponding various splicing positions can also be determined. The different standard collage pictures constituting the bottom layer picture can be from the same original standard picture or from different original standard pictures, but the formed human body structure is the same, so each splicing position in the bottom layer picture is obtained.

The original product picture can be cropped according to the product category (T-shirts, pants, skirts, windbreakers, etc.) of the original product picture to obtain product collage pictures of the upper (T-shirts, shirts, etc.) body part, product collage pictures of the lower (pants, skirts, or shorts) body part, product collage pictures of the one-piece (dresses or jumpsuits) body part, product collage pictures of the foot (shoes) part, or product collage pictures of the outer (windbreakers, short coats, long coats, down jackets, etc.) body part.

Each collage picture obtained by cropping can be saved corresponding to its corresponding content type (constituent part) to form a collage picture set. When receiving a display request from a client terminal, a server terminal can send the collage picture set to the client terminal, so the client terminal displays a display object composed of a plurality of collage pictures. For the display object composed of the plurality of collage pictures and initially displayed by the client terminal, the initial plurality of collage pictures can be pre-configured. For the display object, the user can request to switch the collage pictures.

Figure 4A:
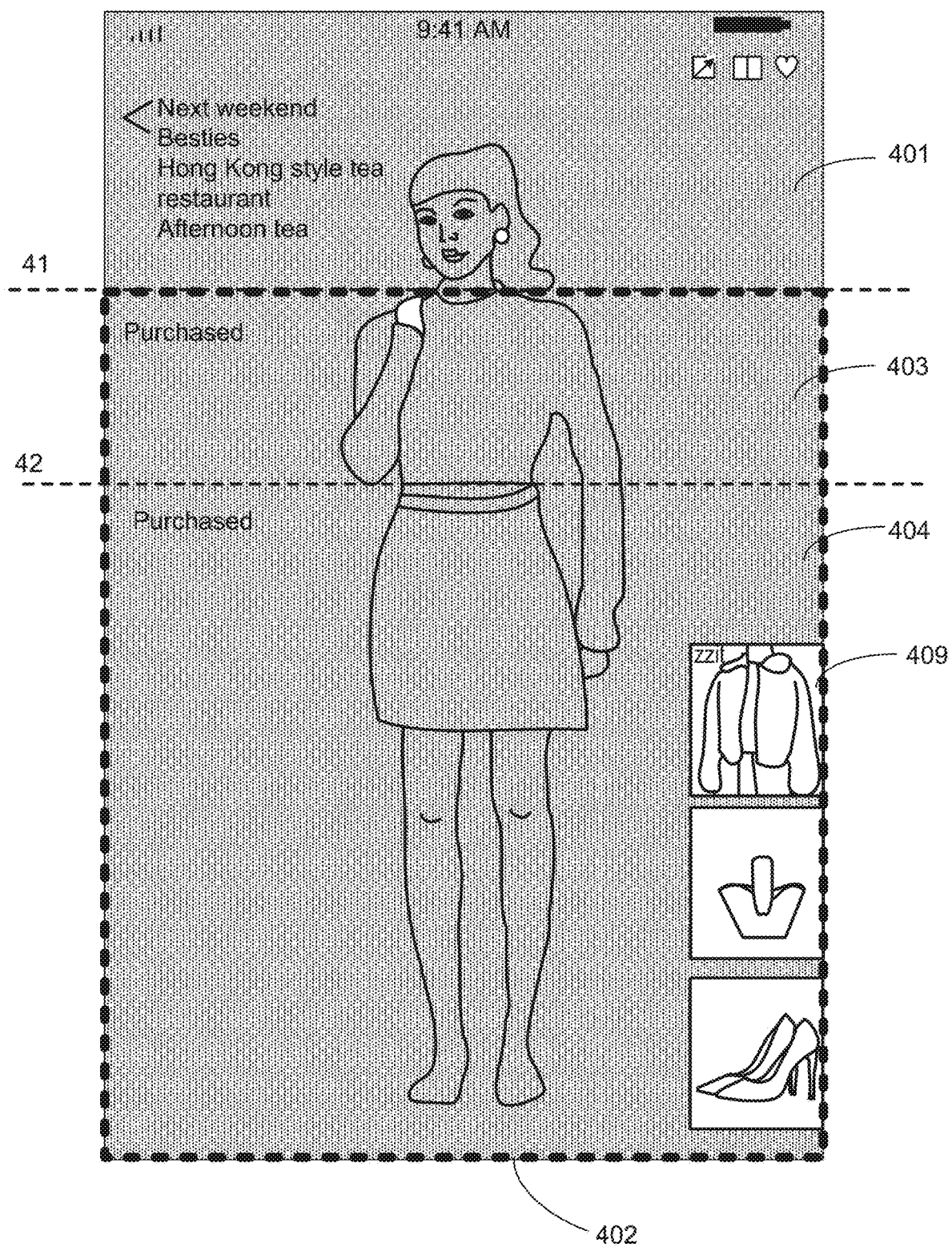
FIG. 4a to FIG. 4d respectively show schematic diagrams of exemplary display of display objects, consistent with some embodiments of the present disclosure.

As shown in FIG. 4a, an exemplary display object composed of a plurality of collage pictures is shown. The exemplary display object consists of standard collage picture 401 of the head part, standard collage picture 402 of body parts other than the head, product collage picture 403 of the upper body part, and product collage picture 404 of the lower body part. Standard collage picture 401 and standard collage picture 402 are spliced to obtain a bottom layer picture, which includes splicing position 41 and splicing position 42; product collage picture 404 uses splicing position 42 as the collage starting position, and product collage picture 403 uses splicing position 41 as the collage starting position, wherein the hierarchical sequence between various collage pictures is: standard collage picture 401 and standard collage picture 402 are located at the bottom layer, product collage picture 404 is located at the second layer on the bottom layer, and product collage picture 403 is located at the third layer on the second layer.

In some embodiments, a switch operation is performed on product collage picture 403 and product collage picture 404, one picture can be randomly selected from various product collage pictures corresponding to the upper body part, or the next product collage picture 405 of product collage picture 403 can be selected according to the display sequence of various product collage pictures corresponding to the upper body part; likewise, one picture can be randomly selected from various product collage pictures corresponding to the lower body part, or the next product collage picture 406 of product collage picture 404 can be selected according to the display sequence of various product collage pictures corresponding to the lower body part.

Figure 4B:
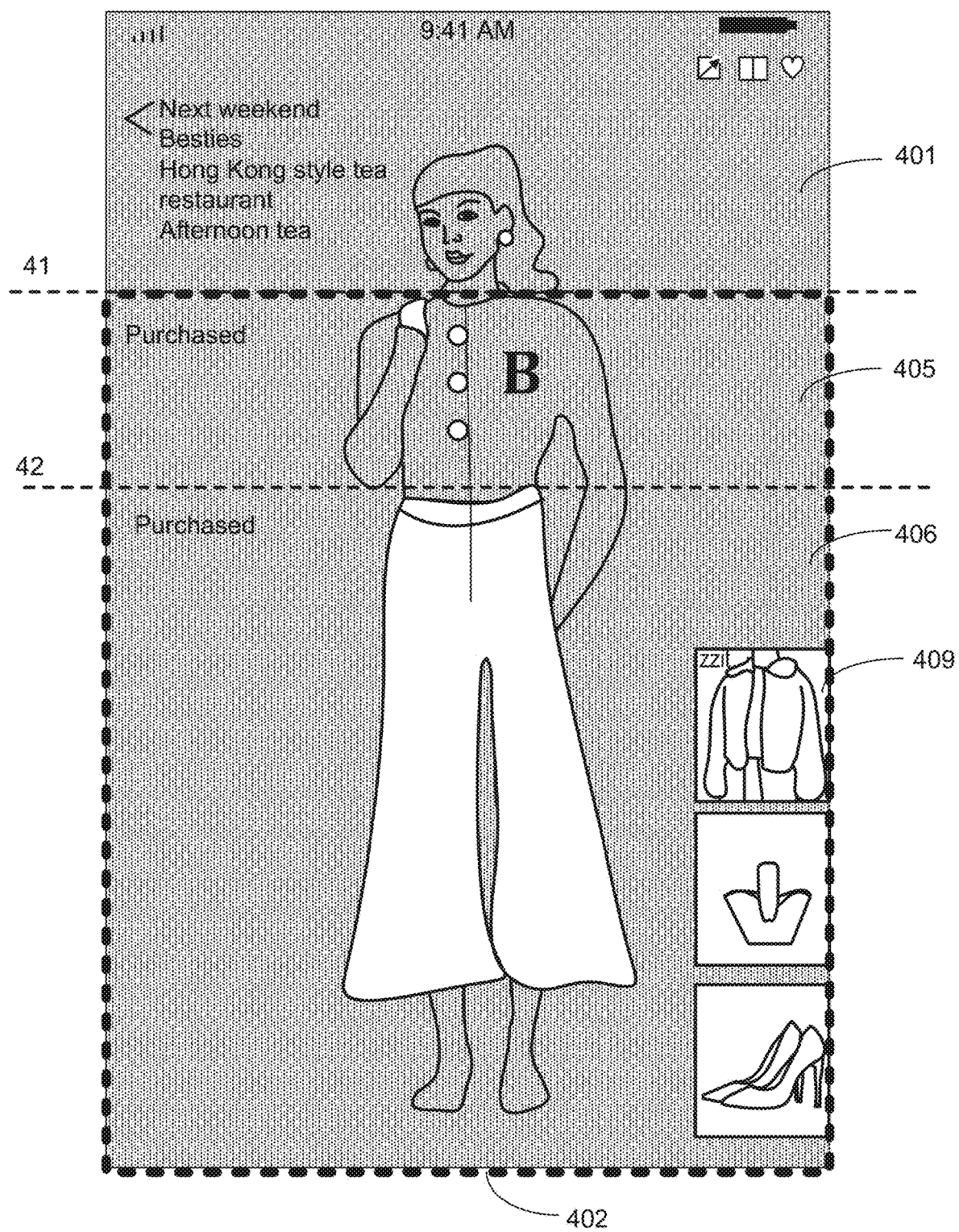

In some embodiments, product collage picture 403 is replaced with product collage picture 405, and product collage picture 404 is replaced with product collage picture 406, so that the updated display object as shown in FIG. 4b can be obtained.

Figure 4C:
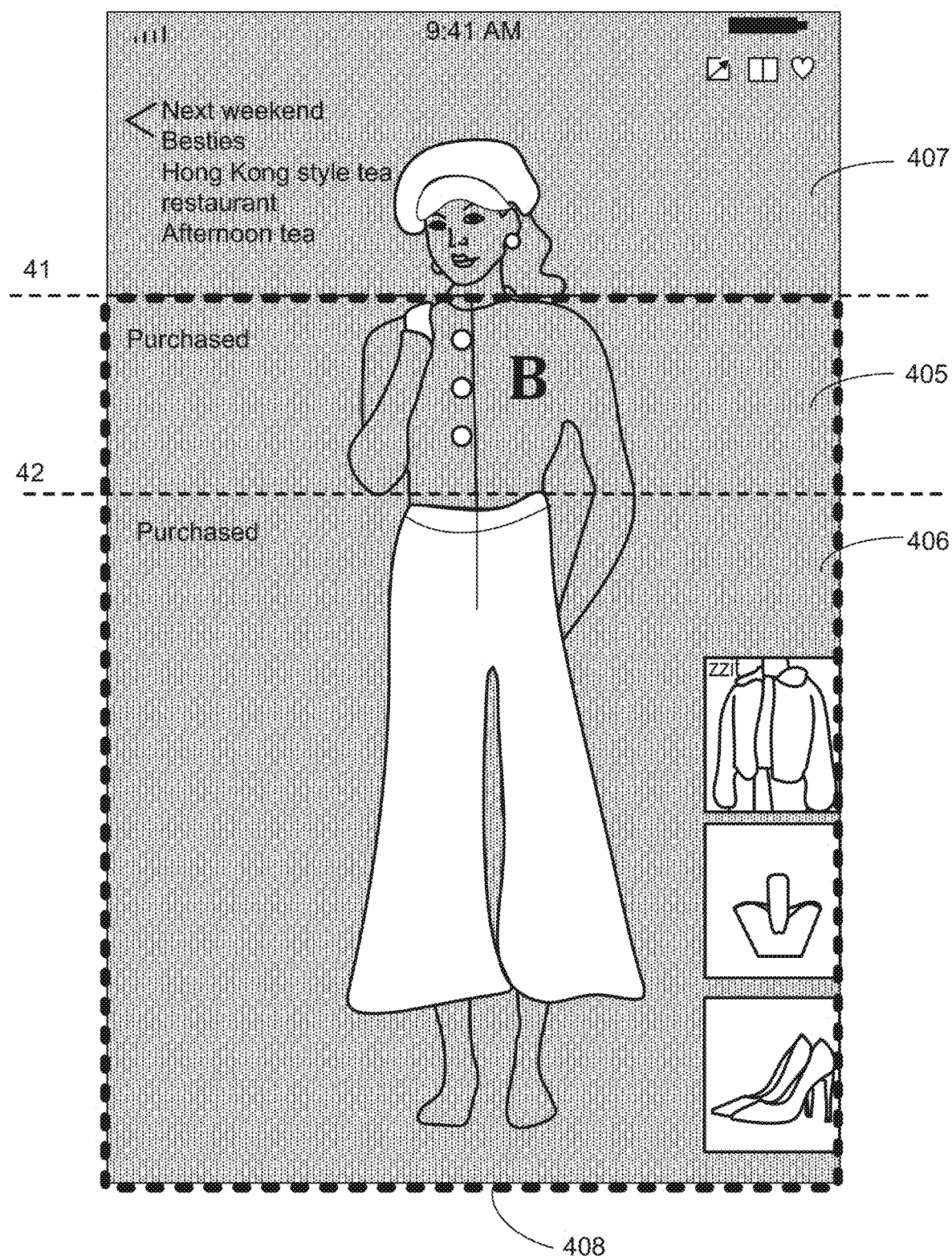

In addition, in order to further improve the visual effect, for product collage picture 403, it is possible to find out whether there is a standard collage picture having picture content that matches it but having content type that is different, and if so, standard collage picture 407 that matches product collage picture 403 is a standard collage picture of the head part as shown in FIG. 4c, then standard collage picture 401 can be replaced with standard collage picture 407.

As for product collage picture 404, in some embodiments, standard collage picture 408 that matches it is a standard collage picture of body parts other than the head, then standard collage picture 402 can be replaced with standard collage picture 408, so as to obtain the updated display object shown in FIG. 4c to further enhance the display effect of the display object.

Figure 4D:
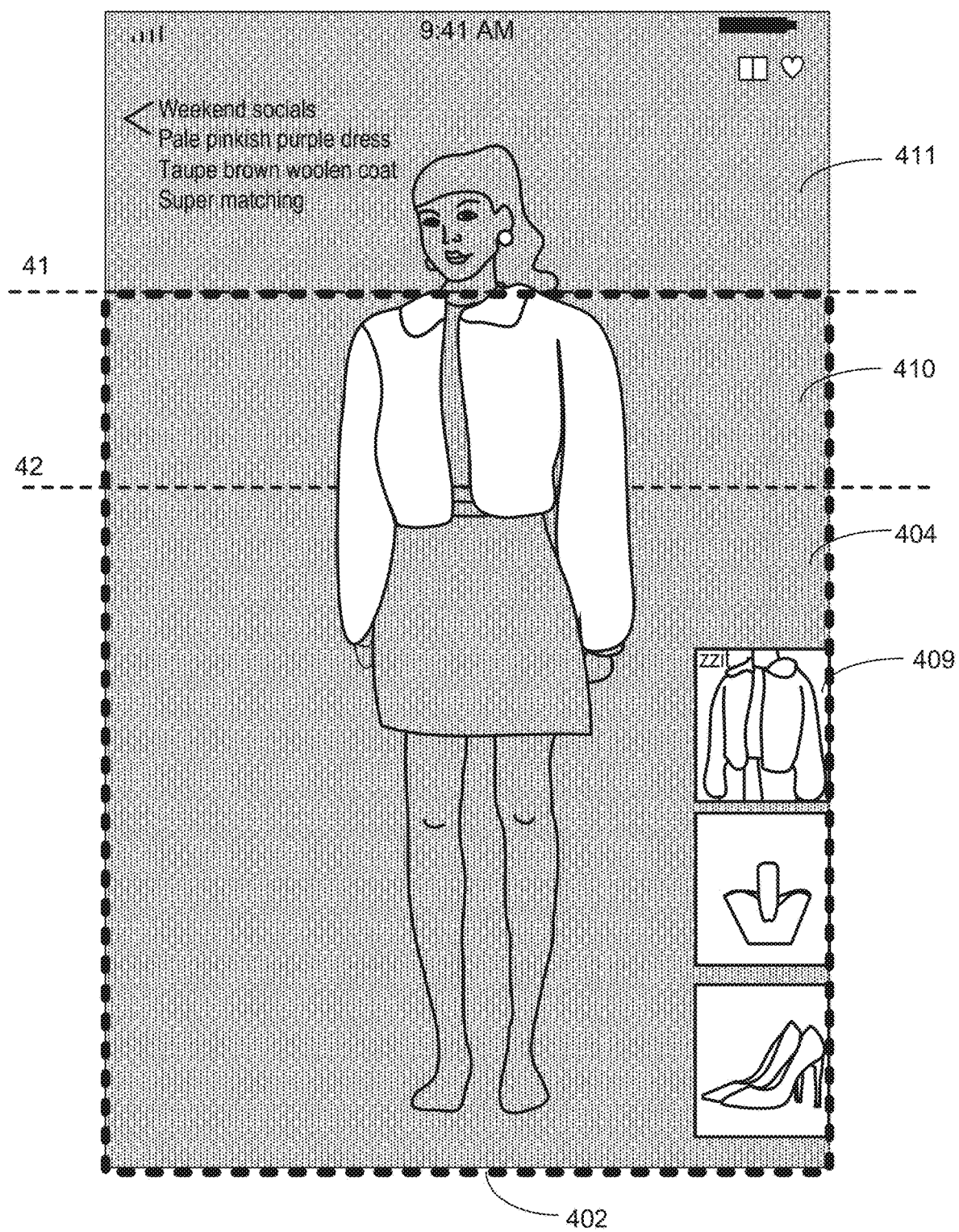

In addition, as shown in FIG. 4a, collage prompt message 409 can also be displayed in an interactive interface. For a selection operation of prompt message 409, as shown in FIG. 4d, corresponding picture to be collaged 410 can be determined. In some embodiments, picture to be collaged 410 is a product collage picture of the outer body part, then picture to be collaged 410 is collaged in the display object according to the collage starting position (i.e., splicing position 41) of picture to be collaged 410, to obtain the updated display object shown in FIG. 4d. In addition, standard collage picture 401 can then be replaced with standard collage picture 411 according to picture to be collaged 410 to beautify the display effect.

In addition, if the product collage picture does not meet the collage requirements of its corresponding constituent part, for example, the proportion of its corresponding constituent part in the product collage picture being different from the proportion of the corresponding constituent part in the original standard picture, it is necessary to adjust the product collage picture, for example, to enlarge or reduce the product collage picture to meet the collage requirements, thereby ensuring that the proportions of the human body structure formed in the display object are coordinated.

Figure 5:
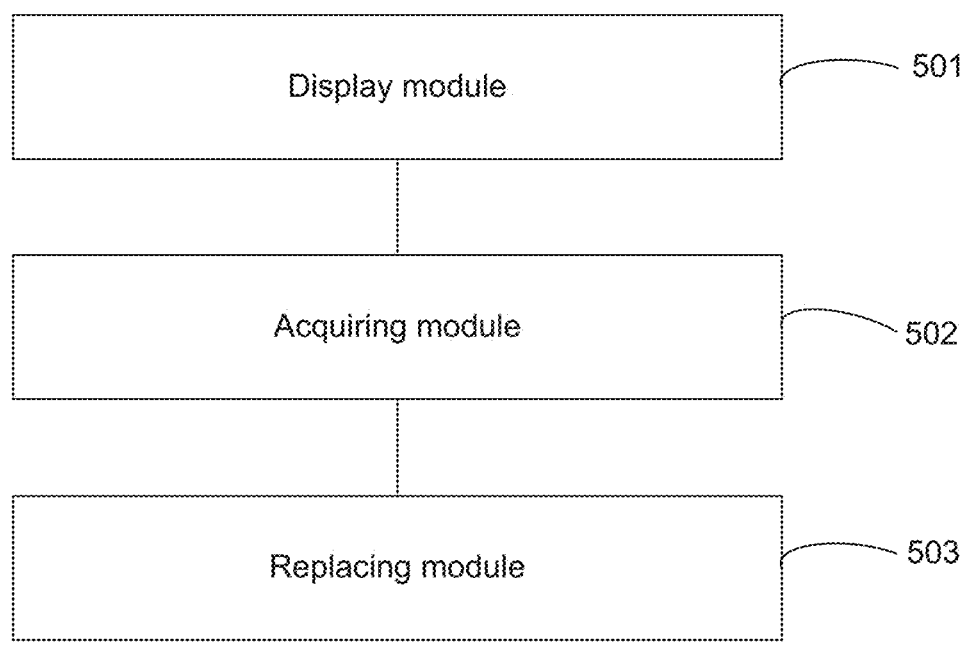
FIG. 5 shows a schematic structural diagram of an embodiment of an interaction apparatus, consistent with some embodiments of the present disclosure.

FIG. 5 shows a schematic structural diagram of an embodiment of an interaction apparatus, consistent with some embodiments of the present disclosure. The apparatus can include a display module 501, an acquiring module 502, and a replacing module 502.

Display module 501 is configured for displaying a display object composed of a plurality of collage pictures;

Acquiring module 502 is configured for acquiring, in response to a switch operation for any one of the collage pictures, a first target collage picture having content type that matches the any one of the collage pictures; and Replacing module 502 is configured for replacing at least the any one of the collage pictures with the first target collage picture.

In some embodiments, the display module is used for splicing a plurality of collage pictures according to a splicing sequence of the plurality of collage pictures to obtain a display object; and displaying the display object.

In some embodiments, the apparatus can further include a splicing sequence determining module. The splicing sequence determining module is configured for acquiring, according to a plurality of content types corresponding to the display object, collage pictures respectively corresponding to the plurality of content types, to obtain the plurality of collage pictures; and taking a splicing sequence corresponding to the plurality of content types as the splicing sequence of the plurality of collage pictures.

In some embodiments, the plurality of collage pictures include at least one bottom layer collage picture and at least one upper layer collage picture.

The display module is specifically used for splicing the at least one bottom layer collage picture according to a splicing sequence of the at least one bottom layer collage picture to obtain a bottom layer picture; determining a collage starting position of the at least one upper layer collage picture in the bottom layer picture; determining a hierarchical sequence of the at least one upper layer collage picture; sequentially combining the at least one upper layer collage picture on the bottom layer picture according to the collage starting position and the hierarchical sequence of the at least one upper layer collage picture to obtain the display object; and displaying the display object.

In some embodiments, the apparatus can further include a picture determining module. The picture determining module is configured for acquiring at least one bottom layer picture content type bottom layer collage picture and at least one upper layer collage picture according to at least one content type of a corresponding bottom layer and at least one content type of a corresponding upper layer of the display object.

In some embodiments, the display module is also used for displaying at least one collage prompt message.

The acquiring module is also used for determining, in response to a selection operation for any one of the collage prompt messages, a picture to be collaged corresponding to the any one of the collage prompt messages.

The replacing module is also used for collaging the picture to be collaged in the display object according to a collage starting position of the picture to be collaged in the bottom layer picture.

In some embodiments, the collage picture is obtained by cropping, according to its content type, picture areas corresponding to the content type in an original picture to which it belongs.

In some embodiments, the collage picture is obtained by recognizing various constituent parts of a target object in an original image to which it belongs, and cropping the original image according to the various constituent parts; and the content type of the collage picture is determined according to its corresponding constituent part.

In some embodiments, the apparatus can further include a searching module and a replacing module.

The searching module is configured for searching for a second target collage picture whose picture content matches the first target collage picture and having content type that is different from the first target collage picture.

The replacing module is also used for replacing an unreplaced collage picture corresponding to the content type of the second target collage picture in the display object with the second target collage picture.

In some embodiments, the apparatus can further include a judging module and an adjusting module.

The judging module is configured for judging whether any one of the upper layer collage pictures meets collage requirements.

The adjusting module is configured for adjusting the any one of the upper layer collage pictures according to the collage requirements if the result of the judging module is that none of the upper layer collage pictures meets the collage requirements.

In some embodiments, the acquiring module is specifically used for acquiring, in response to a specified slide operation for any one of the collage pictures, a first target collage picture having content type that matches the any one of the collage pictures.

In some embodiments, the display module is specifically used for providing an interactive interface; and displaying the display object composed of the plurality of collage pictures in the interactive interface.

In some embodiments, the acquiring module is specifically used for acquiring, in response to a switch operation for any one of the collage pictures, a first target collage picture having content type that contains at least the content type of the any one of the collage pictures.

The replacing module is specifically used for determining at least one picture to be replaced in the plurality of collage pictures according to the content type of the first target collage picture; and replacing the at least one picture to be replaced with the first target collage picture.

In some embodiments, the bottom layer collage picture is obtained by cropping an original standard picture; the original standard picture is obtained by collecting images of human bodies of models; the upper layer collage picture is obtained by cropping an original product picture; and the original product picture includes a human body wearing a product.

The content type of the collage picture is determined according to its corresponding constituent part of the human body. That is, each collage picture corresponds to a constituent part of the human body, and its content type is determined by its corresponding constituent part.

In some embodiments, the acquiring module is specifically used for randomly selecting a collage picture from various collage pictures corresponding to the content type of the any one of the collage pictures or selecting a next adjacent collage picture of the any one of the collage pictures according to a display sequence of the various collage pictures as the first target collage picture.

The exemplary interaction method shown in FIG. 1 can be implemented by the exemplary interaction apparatus described in FIG. 5.

Figure 6:
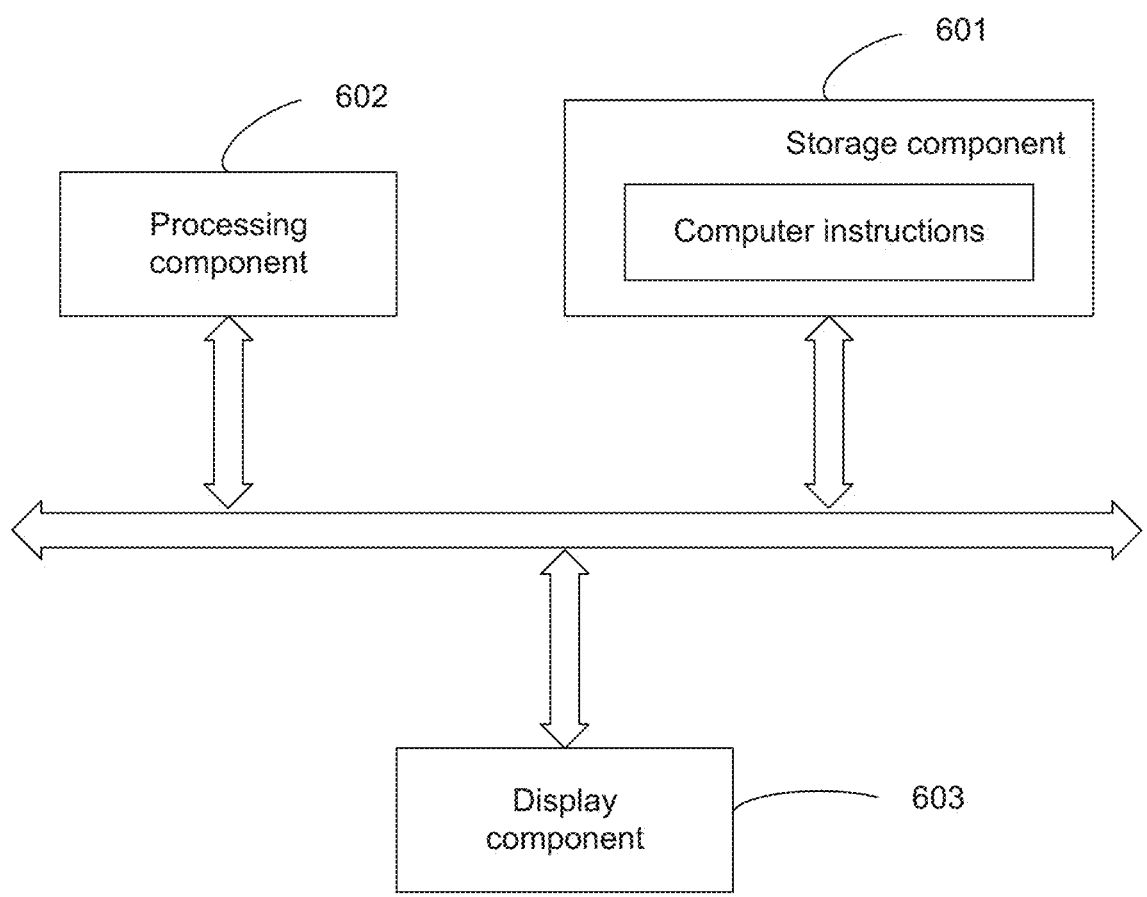
FIG. 6 shows a schematic structural diagram of an exemplary terminal, consistent with some embodiments of the present disclosure.

In some embodiments, the interaction apparatus of the embodiment shown in FIG. 5 can be implemented as a terminal. As shown in FIG. 6, the terminal can include a storage component 601, a processing component 602, and a display component 603.

Storage component 601 is configured to store one or more computer instructions, wherein the one or more computer instructions are called and executed by processing component 602.

Processing component 602 is used for: displaying a display object composed of a plurality of collage pictures through display component 603; acquiring, in response to a switch operation for any one of the collage pictures, a first target collage picture having content type that matches the any one of the collage pictures; and replacing at least the any one of the collage pictures with the first target collage picture.

Here, processing component 602 can include one or more processors to execute the computer instructions to complete all or part of the steps in the above method. Of course, the processing component can also be implemented by one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic elements to perform the above method.

Storage component 601 is configured to store various types of data to support operations on the terminal. The storage component can be implemented by any type of volatile or non-volatile storage device or their combination, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disk.

Display component 603 can be an electroluminescence (EL) element, a liquid crystal display or a micro display with a similar structure, or a retina display or a similar laser scanning display.

The terminal can necessarily also include other components, such as an input/output interface, a communication component, and the like.

The input/output interface provides an interface between a processing component and a peripheral interface module. The above peripheral interface module can be an output device, an input device, and the like.

The communication component is configured to facilitate wired or wireless communication between the terminal and other devices.

An exemplary computer-readable storage medium is also provided. The computer-readable storage medium stores a computer program which, when executed by a computer, can implement the interaction method as shown in FIG. 1.

Figure 7:
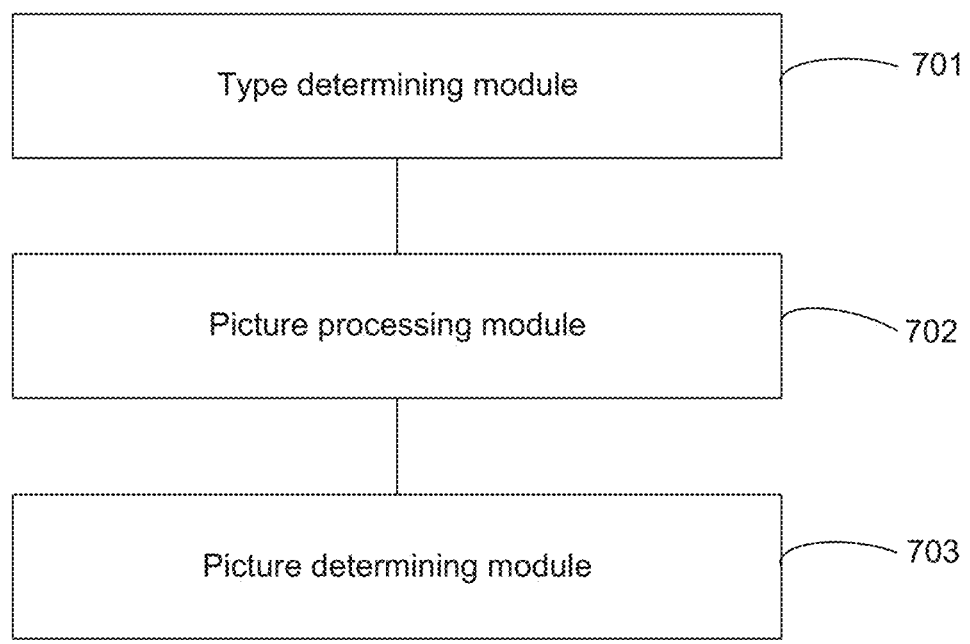
FIG. 7 shows a schematic structural diagram of an exemplary picture processing apparatus, consistent with some embodiments of the present disclosure.

FIG. 7 shows a schematic structural diagram of an exemplary picture processing apparatus, consistent with some embodiments of the present disclosure. The apparatus can include a type determining module 701, a picture processing module 702, and a picture determining module 703.

Type determining module 701 for determining at least one content type corresponding to an original picture.

Picture processing module 702 for cropping the original picture to obtain picture areas respectively corresponding to the at least one content type.

Picture determining module 703 for taking the picture areas respectively corresponding to the at least one content type as collage pictures.

Here, collage pictures of different content types are combined to form a display object.

In some embodiments, the apparatus can further include a saving module and a providing module.

The saving module is configured for saving each collage picture and its corresponding content type to form a collage picture set.

The providing module is configured for providing the collage picture set to a client terminal, so that the client terminal selects a first target collage picture from the collage picture set to replace any one of the collage pictures requested to be switched in the display object.

In some embodiments, the picture processing module is specifically used for recognizing various constituent parts of a target object in an original picture; determining content types respectively corresponding to the various constituent parts; and cutting the original picture according to the various constituent parts to obtain picture areas respectively corresponding to the at least one content type.

The picture determining module is specifically used for taking the picture areas where the constituent parts respectively corresponding to the at least one content type are located as collage pictures.

In some embodiments, the picture processing module can be specifically used for: for a bottom layer original picture, recognizing various first constituent parts of a target object in the bottom layer original picture, determining content types respectively corresponding to the various first constituent parts, and cutting the bottom layer original picture according to the various first constituent parts to obtain picture areas respectively corresponding to the at least one content type; and for an upper layer original picture, recognizing various second constituent parts of the target object in the upper layer original picture, determining content types respectively corresponding to the various second constituent parts, and cutting the upper layer original picture according to the various second constituent parts to obtain picture areas respectively corresponding to the at least one content type.

The picture determining module is specifically used for: for the bottom layer original picture, taking the picture areas where the first constituent parts respectively corresponding to the at least one content type are located as bottom layer collage pictures; and for the upper layer original picture, taking the picture areas where the second constituent parts respectively corresponding to the at least one content type are located as upper layer collage pictures.

At least one bottom layer collage picture is used to be spliced to obtain a bottom layer picture; and at least one upper layer collage picture is used to be collaged on the bottom layer picture to obtain a display object.

In some embodiments, the upper layer original picture is an original product picture; and the bottom layer original picture is an original standard picture.

The type determining module is specifically used for determining, for an original product picture and according to a product category corresponding to the original product picture, a content type corresponding to the product category; and determining, for an original standard picture, at least one content type pre-configured for the original standard picture.

The picture processing apparatus described in FIG. 7 can execute the picture processing method shown in FIG. 3.

Figure 8:
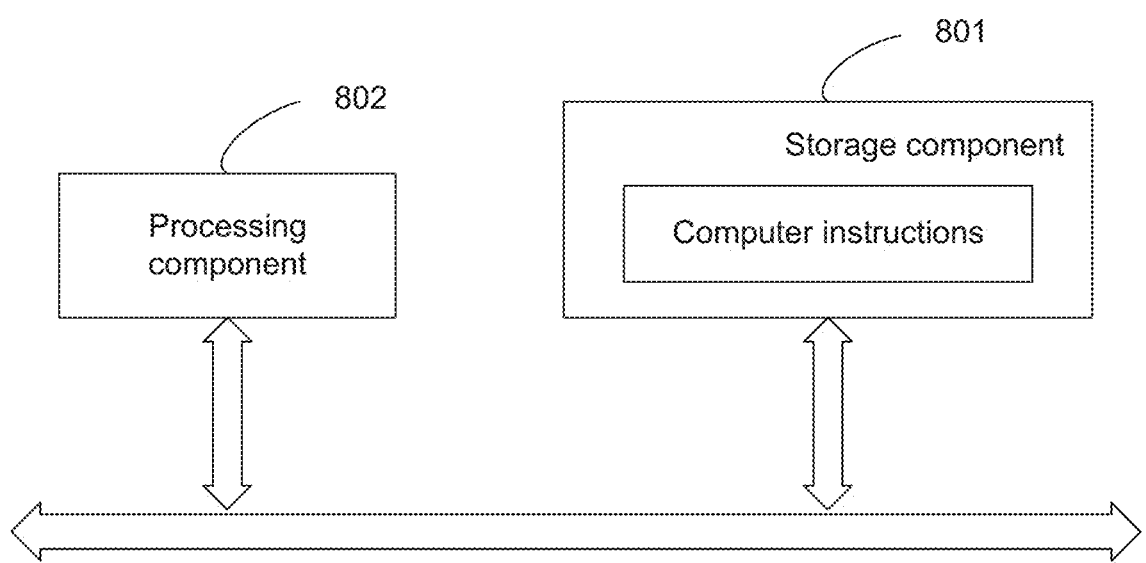
FIG. 8 shows a schematic structural diagram of an exemplary server, consistent with some embodiments of the present disclosure.

In some embodiments, the picture processing apparatus shown in FIG. 7 can be implemented as a server. As shown in FIG. 8, the server can include a storage component 801 and a processing component 802.

Storage component 801 is configured to store one or more computer instructions, wherein the one or more computer instructions are called and executed by processing component 802.

Processing component 802 is used for: determining at least one content type corresponding to an original picture; cropping the original picture to obtain picture areas respectively corresponding to the at least one content type; and taking the picture areas respectively corresponding to the at least one content type as collage pictures.

Here, collage pictures of different content types are combined to form a display object.

Here, processing component 802 can include one or more processors to execute the computer instructions to complete all or part of the steps in the above method. Of course, the processing component can also be implemented by one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic elements to perform the above method.

Storage component 801 is configured to store various types of data to support operations on the server. The storage component can be implemented by any type of volatile or non-volatile storage device or their combination, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disk.

In some embodiments, the server can necessarily also include other components, such as an input/output interface, a communication component, and the like.

The input/output interface provides an interface between a processing component and a peripheral interface module. The above peripheral interface module can be an output device, an input device, and the like.

The communication component is configured to facilitate wired or wireless communication between the server and other devices.

A computer-readable storage medium is also provided in the embodiments of the present disclosure. The computer-readable storage medium stores a computer program which, when executed by a computer, can implement the picture processing method shown in FIG. 3.

It is appreciated that terms "first," "second," and so on used in the specification, claims, and the drawings of the present disclosure are used to distinguish similar objects. These terms do not necessarily describe a particular order or sequence. The objects described using these terms can be interchanged in appropriate circumstances. That is, the procedures described in the exemplary embodiments of the present disclosure could be implemented in an order other than those shown or described herein. In addition, terms such as "comprise," "include," and "have" as well as their variations are intended to cover non-exclusive inclusion. For example, a process, method, system, product, or device including a series of steps or units are not necessarily limited to the steps or units clearly listed. In some embodiments, they may include other steps or units that are not clearly listed or inherent to the process, method, product, or device.

As used herein, unless specifically stated otherwise, the term "or" encompasses all possible combinations, except where infeasible. For example, if it is stated that a device may include A or B, then, unless specifically stated otherwise or infeasible, the device may include A, or B, or A and B. As a second example, if it is stated that a device may include A, B, or C, then, unless specifically stated otherwise or infeasible, the device may include A, or B, or C, or A and B, or A and C, or B and C, or A and B and C.

Based on the several embodiments provided in the present disclosure, it should be appreciated that the disclosed technical contents may be implemented in another manner. The described apparatus, system, and method embodiments are only exemplary. For example, division of units or modules are merely exemplary division based on the logical functions. Division in another manner may exist in actual implementation. Further, a plurality of units or components may be combined or integrated into another system. Some features or components may be omitted or modified in some embodiments. In addition, the mutual coupling or direct coupling or communication connections displayed or discussed may be implemented by using some interfaces. The indirect coupling or communication connections between the units or modules may be implemented electrically or in another form.

Further, the units described as separate parts may or may not be physically separate. Parts displayed as units may or may not be physical units. They may be located in a same location or may be distributed on a plurality of network units. Some or all of the units may be selected according to actual needs to achieve the objectives of the solutions of the embodiments. In addition, functional units in the embodiments of the present disclosure may be integrated into one processing unit. Each of the units may exist alone physically, or two or more units can be integrated into one unit. The integrated unit may be implemented in a form of hardware or may be implemented in a form of a software functional unit.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

It is appreciated that the above descriptions are only exemplary embodiments provided in the present disclosure. Consistent with the present disclosure, those of ordinary skill in the art may incorporate variations and modifications in actual implementation, without departing from the principles of the present disclosure. Such variations and modifications shall all fall within the protection scope of the present disclosure.

It is appreciated that all or some of the procedures in the methods of the foregoing embodiments can be implemented by a program instructing relevant hardware components of a terminal device. The program can be stored in a computer readable storage medium. The storage medium includes a flash memory, a Read-Only Memory (ROM), a Random Access Memory (RAM), a magnetic disk, or an optical disc.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

It is appreciated that all or some of the procedures in the methods of the foregoing embodiments can be implemented by a program instructing relevant hardware components of a terminal device. The program can be stored in a computer readable storage medium. The storage medium includes a flash memory, a Read-Only Memory (ROM), a Random Access Memory (RAM), a magnetic disk, or an optical disc.

What is claimed is:

1. An interaction method, comprising:
   obtaining a display object comprising a plurality of collage pictures for display, wherein the plurality of collage pictures comprise at least one bottom layer collage picture and at least one upper layer collage picture, and obtaining the display object comprising the plurality of collage pictures for display comprises:
   splicing the at least one bottom layer collage picture according to a splicing sequence of the at least one bottom layer collage picture to obtain a bottom layer picture;
   determining a collage starting position of the at least one upper layer collage picture in the bottom layer picture;
   determining a hierarchical sequence of the at least one upper layer collage picture; and
   sequentially combining the at least one upper layer collage picture on the bottom layer picture according to the collage starting position and the hierarchical sequence of the at least one upper layer collage picture to obtain the display object;
   acquiring, in response to a switch operation for at least one collage picture of the plurality of collage pictures of the display object, a first target collage picture, wherein a first target content type of the first target collage picture matches a content type of the at least one collage picture; and
   replacing the at least one collage picture with the first target collage picture.

2. The method according to claim 1, wherein obtaining the display object comprising the plurality of collage pictures for display comprises
   splicing the plurality of collage pictures according to a splicing sequence of the plurality of collage pictures to obtain the display object.

3. The method according to claim 2, further comprising:
   according to a plurality of content types corresponding to the display object, acquiring the plurality of collage pictures respectively corresponding to the plurality of content types to obtain the plurality of collage pictures; and
   taking a splicing sequence corresponding to the plurality of content types as the splicing sequence of the plurality of collage pictures.

4. The method according to claim 1, further comprising:
   acquiring at least one bottom layer collage picture and at least one upper layer collage picture according to at least one content type of a corresponding bottom layer picture and at least one content type of a corresponding upper layer picture of the display object.

5. The method according to claim 1, further comprising:
determining, in response to a selection operation for at least one collage prompt message, a picture to be collaged corresponding to at least one collage prompt message; and
collaging the picture to be collaged in the display object according to a collage starting position of the picture to be collaged in the bottom layer picture.

6. The method according to claim 1, wherein the at least one collage picture is obtained by cropping, according to the content type of the at least one collage picture, a picture area corresponding to the content type in an original picture to which the at least one collage picture belongs.

7. The method according to claim 1, wherein the at least one collage picture is obtained by recognizing a plurality of constituent parts of a target object in an original image to which the at least one collage picture belongs, and cropping the original image according to the plurality of constituent parts; and the content type of the at least one collage picture is determined according to the corresponding constituent part.

8. The method according to claim 1, wherein after replacing the at least one collage picture with the first target collage picture, the method further comprises:
searching for a second target collage picture, wherein picture content of the second target collage picture matches picture content of the first target collage picture and a second target content type of the second target collage picture is different from the first target content type of the first target collage picture; and
replacing, among a group of the plurality of collage pictures that have not been replaced, an unreplaced collage picture corresponding to the second target content type of the second target collage picture in the display object with the second target collage picture.

9. The method according to claim 1, wherein before sequentially combining the at least one upper layer collage picture on the bottom layer picture according to the collage starting position and the hierarchical sequence of the at least one upper layer collage picture to obtain the display object, the method further comprises:
determining whether at least one of the upper layer collage pictures meets a collage requirement; and
in response to a determination that the at least one of the upper layer collage pictures does not meet the collage requirement, adjusting the at least one of the upper layer collage pictures according to the collage requirement.

10. The method according to claim 1, wherein acquiring, in response to the switch operation for the at least one collage picture of the plurality of collage pictures, the first target collage picture comprises:
acquiring, in response to a slide operation for the at least one collage picture, a first target collage picture.

11. The method according to claim 1, further comprising:
providing an interactive interface; and
displaying the display object comprising the plurality of collage pictures comprises:
displaying the display object comprising the plurality of collage pictures in the interactive interface.

12. The method according to claim 1, wherein the first target content type of the first target collage picture contains at least the content type of the at least one collage picture, replacing the at least one collage picture with the first target collage picture comprises:
determining the at least one collage picture of the plurality of collage pictures according to the first target content type of the first target collage picture; and
replacing the at least one collage picture with the first target collage picture.

13. The method according to claim 1, wherein the bottom layer collage picture is obtained by cropping an original standard picture; the original standard picture is obtained by collecting images of human bodies of models; the upper layer collage picture is obtained by cropping an original product picture; and the original product picture comprises an image of a human body wearing a product, wherein
the content type of the collage picture is determined according to a corresponding constituent part of the human body.

14. The method according to claim 1, wherein acquiring, in response to the switch operation for the at least one collage picture of the plurality of collage pictures, the first target collage picture comprises:
determining the first target collage picture by at least one of
randomly selecting a collage picture among the plurality of collage pictures corresponding to the content type of the at least one collage picture, or
selecting a next adjacent collage picture of the at least one collage picture according to a display sequence of the plurality of collage pictures.

15. An interaction apparatus, comprising:
a memory storing a set of instructions; and
one or more processors configured to execute the set of instructions to cause the apparatus to perform:
obtaining a display object comprising a plurality of collage pictures for display, wherein the plurality of collage pictures comprise at least one bottom layer collage picture and at least one upper layer collage picture, and obtaining the display object comprising the plurality of collage pictures for display comprises:
splicing the at least one bottom layer collage picture according to a splicing sequence of the at least one bottom layer collage picture to obtain a bottom layer picture;
determining a collage starting position of the at least one upper layer collage picture in the bottom layer picture;
determining a hierarchical sequence of the at least one upper layer collage picture; and
sequentially combining the at least one upper layer collage picture on the bottom layer picture according to the collage starting position and the hierarchical sequence of the at least one upper layer collage picture to obtain the display object;
acquiring, in response to a switch operation for at least one collage picture of the plurality of collage pictures of the display object, a first target collage picture, wherein a first target content type of the first target collage picture matches a content type of the at least one collage picture; and
replacing the at least one collage picture with the first target collage picture.

16. A non-transitory computer readable medium that stores a set of instructions that is executable by at least one processor of a computer to cause the computer to perform an interaction method, the method comprising:
obtaining a display object comprising a plurality of collage pictures for display, wherein the plurality of collage pictures comprise at least one bottom layer collage picture and at least one upper layer collage picture, and obtaining the display object comprising the plurality of collage pictures for display comprises:
- splicing the at least one bottom layer collage picture according to a splicing sequence of the at least one bottom layer collage picture to obtain a bottom layer picture;
- determining a collage starting position of the at least one upper layer collage picture in the bottom layer picture;
- determining a hierarchical sequence of the at least one upper layer collage picture; and sequentially combining the at least one upper layer collage picture on the bottom layer picture according to the collage starting position and the hierarchical sequence of the at least one upper layer collage picture to obtain the display object;

acquiring, in response to a switch operation for at least one collage picture of the plurality of collage pictures of the display object, a first target collage picture, wherein a first target content type of the first target collage picture matches a content type of the at least one collage picture; and replacing the at least one collage picture with the first target collage picture.

17. The non-transitory computer readable medium of claim 16, wherein obtaining the display object comprising the plurality of collage pictures for display comprises splicing the plurality of collage pictures according to a splicing sequence of the plurality of collage pictures to obtain the display object.

18. The non-transitory computer readable medium of claim 17, wherein the at least one processor configured to execute the set of instructions to cause the computer to further perform:

according to a plurality of content types corresponding to the display object, acquiring the plurality of collage pictures respectively corresponding to the plurality of content types to obtain the plurality of collage pictures; and taking a splicing sequence corresponding to the plurality of content types as the splicing sequence of the plurality of collage pictures.

\* \* \* \* \*